Patented Nov. 15, 1927.

1,649,281

UNITED STATES PATENT OFFICE.

JOHN BILLWILLER, OF SEEHAUSEN, GERMANY.

METHOD OF LOOSENING VEGETABLE FIBERS.

No Drawing. Application filed September 11, 1922, Serial No. 587,576, and in Switzerland July 13, 1922.

The object of the invention is the production of cellulose fiber for making paper and paper-like products, and the invention consists in the loosening of the fibers by acting on the cementing substances that hold them together by the aid of liquids that carbonize or injure the fiber as little as possible, and preferably at a temperature as high as possible without carbonizing the fibers.

The action of the loosening liquids employed, that is, their intensity of action, is more or less dependent on the extent of ionization, and therefore the effect may be regulated to that desired by changing the degree of ionization by dilution with water.

The loosening liquids that I use are concentrated solutions of ammonium hydroxide, saturated solutions of sodium carbonate, or sulphuretted hydrogen, and the like.

The method is carried out in such a way that the loosening liquids are caused to entirely cover or wash over and around the fibrous substances vigorously. In a few minutes there is attained either a complete loosening of the fibers, or a partial loosening, according to the degree of concentration of the loosening solution used.

The full details of the method are described as follows:

The loosening liquid, for instance a concentrated solution of ammonium hydroxide in a superheated condition is caused to circulate through the cellulose material in a closed container, as an autoclave, a digester or the like. The circulation is conducted by a centrifugal or other type of circulating pump capable of operating under the pressure prevailing in the container.

The substances treated may be of different origin such as wood, flax-straw, bran and other materials, all of which are loosened excellently by this method. Furthermore, the linseed oil may be simply and completely recovered.

The temperature may be raised to nearly 280° C. without materially changing the color of the fibers or materially carbonizing the cellular substance. I operate at temperatures of at least 180° C., that is, above 179° C., and so using pressures of 18 atmospheres and over.

The further operation on the cellulose material may be carried out by any of the well known processes for obtaining cellulose or fiber for the manufacture of textiles and paper.

It has proven advantageous in many cases to accomplish the loosening and separation of the fibers in two phases. In the first phase, the hydroxide of ammonia or other liquids having carbonizing action are caused to act slowly on the cellulose material or raw fibrous substances to partially loosen the fibers at a high temperature and at high pressure. After this preliminary treatment, the loosening or separation is completed according to some one of the well-known methods.

Experiments have shown that all fiber yielding materials may be preliminarily treated in the manner described, and then the separation of the fiber completed by the customary sulphite or soda process.

The loosening or separation of the fibers in two phases can be united by employing quantities of solutions of ammonium hydroxide of any desired concentration mixed with liquids that have been used before, and in accordance with the material to be treated.

Furthermore, experiments have shown that the separation or loosening of the fibers of any kind is facilitated by catalysts.

Such catalysts, for instance, copper, nickel and iron, that hasten the reactions, may be placed either in the vessels or apparatus used for the loosening or digestion of the material to be treated, or the vessels or apparatus when made or lined with such metals may themselves act as the catalyst.

*Example.*

500 kg. of wood and 300 l. of a two percent solution of ammonium hydroxide heated to 280° C. are placed in an iron vessel capable of standing the desired pressure. By means of a centrifugal pump the hot solution is pumped over the wood for ten minutes.

After draining off the ammonium hydroxide solution, the completely loosened fibers may be further treated in any desired manner.

The process is distinguished from other processes for similar purpose by its very general application, for example, for textile purposes, for the manufacture of paper, for making cattle food, as a preliminary treatment for the formation of sugar from cellulose materials etc.

My process is also advantageous by reason of its economy, as it may be very favorably carried out with regard to thermic conditions, and because the liquids used may be considerably varied in accordance with their prevailing cost.

Further, and what is highly important, the spent liquors are suitable for fermentation and for use as fertilizing material.

I claim—

1. The art of treating fibrous materials containing carbo-hydrates and similar substances, which comprises subjecting the material for less than half an hour in a closed chamber at a temperature above 179° C. and the corresponding pressures to a solution that loosens the fibers and acts but slowly to discolor them.

2. The art of treating fibrous materials containing carbo-hydrates and similar substances, which comprises subjecting the material for a short time (less than half an hour) in a closed chamber at a temperature above 180° C., and corresponding pressures to the action of a solution that loosens the fibers and discolors them but slowly while pumping the solution continuously through the fibers.

3. The art of treating fibrous materials, which comprises subjecting the material to a preliminary treatment for a short time in a closed chamber at a temperature above 179° C. and the corresponding pressure to the action of a solution capable of loosening the fibers and which solution acts to discolor the fibers slowly at the temperature and corresponding pressure used, and then treating the material with any well known fiber loosening solution at the customary temperature and pressure.

4. The art of treating fibrous material, which comprises subjecting the material in a closed chamber to an ammonium hydroxide solution at a temperature of at least 180° C. and the corresponding pressure and thereafter treating the material with a sulphite solution at the customary temperature and pressure.

5. Method of treating fibrous material, which comprises subjecting the material in a closed chamber for a short time to a temperature above 180° C. with a solution of ammonium hydroxide in the presence of copper and thereafter completing the loosening of the fibers by any other suitable loosening solution at the customary temperature and pressure.

In testimony that I claim the foregoing as my invention, I have signed my name.

DIPL. ING. JOHN BILLWILLER.